(12) United States Patent
Gustavsson et al.

(10) Patent No.: US 9,652,017 B2
(45) Date of Patent: May 16, 2017

(54) SYSTEM AND METHOD OF ANALYZING AUDIO DATA SAMPLES ASSOCIATED WITH SPEECH RECOGNITION

(71) Applicant: QUALCOMM Incorporated, San Diego, CA (US)

(72) Inventors: Bengt Stefan Gustavsson, San Diego, CA (US); Magesh Hariharan, San Diego, CA (US); Siva Pavan Kumar Mitnala, San Diego, CA (US); John Michael Murray, Carlsbad, CA (US); Peter Jivan Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 14/573,402

(22) Filed: Dec. 17, 2014

(65) Prior Publication Data

US 2016/0180837 A1 Jun. 23, 2016

(51) Int. Cl.
*G10L 15/08* (2006.01)
*G06F 1/32* (2006.01)
*G10L 15/22* (2006.01)
*G10L 15/28* (2013.01)

(52) U.S. Cl.
CPC ............ *G06F 1/3203* (2013.01); *G10L 15/22* (2013.01); *G10L 15/28* (2013.01); *G10L 2015/088* (2013.01)

(58) Field of Classification Search
CPC .. G10L 15/08; G10L 2015/088; G06F 1/3203
See application file for complete search history.

(56) References Cited

U.S. PATENT DOCUMENTS

| 5,881,312 A | 3/1999 | Dulong |
| 8,781,832 B2 | 7/2014 | Comerford et al. |
| 2010/0185488 A1* | 7/2010 | Hogan ............... H04L 12/14 705/30 |
| 2013/0110521 A1 | 5/2013 | Hwang et al. |
| 2013/0339028 A1* | 12/2013 | Rosner ............... G10L 15/222 704/275 |
| 2014/0122078 A1* | 5/2014 | Joshi ............... G06F 1/324 704/251 |

(Continued)

FOREIGN PATENT DOCUMENTS

KR 101368464 B1 2/2014

OTHER PUBLICATIONS

Diaz, J., et al., "Voice Recognition System," 6.111 Final Project, May 2007, Massachusetts Institute of Technology, Cambridge, Massachusetts, pp. 1-17.

*Primary Examiner* — Qian Yang
(74) *Attorney, Agent, or Firm* — Toler Law Group, PC

(57) ABSTRACT

A particular apparatus includes a coder/decoder (CODEC) including a first processor and a first buffer. The first processor is configured to analyze audio data samples to detect a keyword. The CODEC is configured to store a set of audio data samples at the first buffer. The apparatus also includes an application processor configured to receive the set of audio data samples from the CODEC via a bus and configured to initialize a speech recognition engine (SRE) based on the set of audio data samples. The application processor is configured to initialize the bus based on an indication from the CODEC that the keyword is detected.

20 Claims, 6 Drawing Sheets

(56) References Cited

U.S. PATENT DOCUMENTS

| | | | |
|---|---|---|---|
| 2016/0066113 A1* | 3/2016 | Elkhatib | H04R 29/004 381/56 |
| 2016/0171975 A1* | 6/2016 | Sun | G06F 1/3206 704/234 |
| 2016/0379635 A1* | 12/2016 | Page | G10L 15/22 704/251 |

* cited by examiner

SYSTEM AND METHOD OF ANALYZING AUDIO DATA SAMPLES ASSOCIATED WITH SPEECH RECOGNITION

I. FIELD

The present disclosure is generally related to speech recognition.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

To enable hands-free operation, mobile devices increasingly allow users to provide input via speech. Speech recognition functions can use considerable processing power. Accordingly, a mobile device may turn off certain speech recognition capabilities (e.g., circuits or subsystems used for speech recognition) while the mobile device is in a low power state (e.g., a sleep or standby state) in order to conserve power. The mobile device may include a speech detector that is operational when the mobile device is in the low-power state. The speech detector may activate the speech recognition capabilities (e.g., by waking up the circuits or subsystems used for speech recognition) when speech is detected. For example, when the speech detector detects user speech (or a user utterance corresponding to a keyword), the speech detector may activate the speech recognition capabilities. When the speech recognition capabilities are ready to receive input, the mobile device may provide a prompt to the user indicating that the mobile device is ready to receive a command. Because of the time it takes to prepare the speech recognition capabilities to receive input, there can be a delay between when the user speaks to wake up the mobile device and when the user is able to provide the command.

III. SUMMARY

It may be more convenient to the user to awaken a mobile device and provide a command to the mobile device using a single sentence or utterance (e.g., without waiting for a prompt from the mobile device to indicate that the mobile device is ready to receive a command). For example, the user may prefer to use an ordinary sentence structure to address the mobile device (e.g., using a keyword) and to state the command or interrogatory (e.g. a command phrase). To illustrate, the user may state "Device, what is the weather like outside?" without unusual pauses.

In order to accommodate such a keyword/command phrase input (e.g., a sentence) when the speech recognition capabilities of the mobile device are in a low power state, the mobile device may buffer (e.g., save in a memory device) audio data corresponding to the speech and subsequently process the audio data when the speech recognition capabilities are ready. The speech recognition capabilities may be provided by or may correspond to a processor that executes a speech recognition engine. Thus, making the speech recognition capabilities ready to process speech may include transitioning the processor from a low power state (e.g. a sleep state or standby state) to a higher power state (e.g., a ready state) and loading instructions corresponding to the speech recognition engine to the processor.

In a particular aspect, a mobile device may include a coder/decoder (CODEC) that includes a keyword detector (e.g., a digital signal processor executing instructions to detect a keyword (or a set of keywords) in user speech). The mobile device may also include an application processor configured to execute a speech recognition engine. The keyword detector may be a relatively low power device as compared to the application processor. Thus, when the mobile device is in a low power state, the keyword detector may remain active and the application processor may be inactive (e.g., in a sleep or standby state). The CODEC may also include a first buffer. When the keyword detector detects a keyword in audio data corresponding to an utterance from the user, the CODEC may buffer the audio data at the first buffer. Additionally, in response to detecting the keyword, the CODEC may send an indication to the application processor to cause the application processor to awaken from the low power state. In response to receiving an indication from the CODEC, the application processor may activate (e.g., initialize) a bus that couples the application processor to the CODEC to enable communication between the CODEC and the application processor. Additionally, the application processor may begin initializing the speech recognition engine (e.g., loading instructions corresponding to the speech recognition engine from a memory).

The CODEC may continue to buffer the audio data until the bus between the application processor and the CODEC is active. When the bus is ready, the audio data at the first buffer may be transferred via the bus to a second buffer at the application processor. The first buffer may have less storage capacity than the second buffer (e.g., to reduce cost associated with the first buffer). For example, while the second buffer may be capable of storing audio data associated with an entire command phrase, the first buffer may not have sufficient capacity to store the entire command phrase. After the keyword is detected and while the speech recognition engine is being prepared, audio data (e.g., portions of the command phrase) may continue to be received at the mobile device. The audio data may be buffered at the first buffer and transferred, in a first in first out manner, from the first buffer to the second buffer via the bus. Thus, the first buffer need not be large enough to store the entire command phrase. Rather, it is sufficient for the first buffer to be large enough to store audio data that is received during a time for the bus to be initialized.

The second buffer may continue to receive and buffer audio data while the speech recognition engine is prepared for execution. When the speech recognition engine is ready, the speech recognition engine may access the audio data from the second buffer to perform speech recognition to determine whether the audio data includes a command phrase. When the audio data includes a command phrase, the application processor may cause an action corresponding to the command phrase to be performed. For example the application processor may cause an application associated with the command phrase to be executed or may provide input to the application based on the command phrase.

In a particular aspect, an apparatus includes a coder/decoder (CODEC) including a first processor and a first buffer. The first processor is configured to analyze audio data samples to detect a keyword, and the CODEC is configured to store a set of audio data samples at the first buffer. The apparatus also includes an application processor configured to receive the set of audio data samples from the CODEC via a bus and configured to initialize a speech recognition engine (SRE) based on the set of audio data samples. The application processor is configured to initialize the bus based on an indication from the CODEC that the keyword is detected.

In another particular aspect, a method includes obtaining audio data samples at a first processor and analyzing the audio data samples to detect a keyword. The method also includes, after detecting the keyword, storing a set of audio data samples at a first buffer of a CODEC and sending an indication of detection of the keyword to an application processor. The application processor is configured to initializes a bus to enable communication between the CODEC and the application processor based on the indication from the CODEC. The method also includes, after the bus is initialized, sending the set of audio data samples to the application processor to perform speech recognition.

In another particular aspect, a computer-readable storage device stores instructions that are executable by a processor of a coder/decoder (CODEC) to cause the processor to perform operations including analyzing audio data samples to detect a keyword. The operations also include, after detecting the keyword, storing a set of audio data samples at a first buffer of the CODEC and sending an indication of detection of the keyword to an application processor. The application processor is configured to initialize a bus to enable communications between the CODEC and the application processor based on the indication from the CODEC. The operations also include, after the bus is initialized, sending the set of audio data samples to the application processor to perform speech recognition.

One particular advantage provided by at least one of the disclosed embodiments is that buffering audio data at the CODEC before providing the audio data to a second buffer at the application processor, as described herein, allows the user to conveniently provide a keyword/command phrase sentence (without waiting for the mobile device to wake up and provide a prompt). Additionally, cost of the mobile device is not significantly increased by this arrangement because a relatively low cost buffer can be used at the CODEC since the buffer at the CODEC does not need to be large enough to store the entire command phrase.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
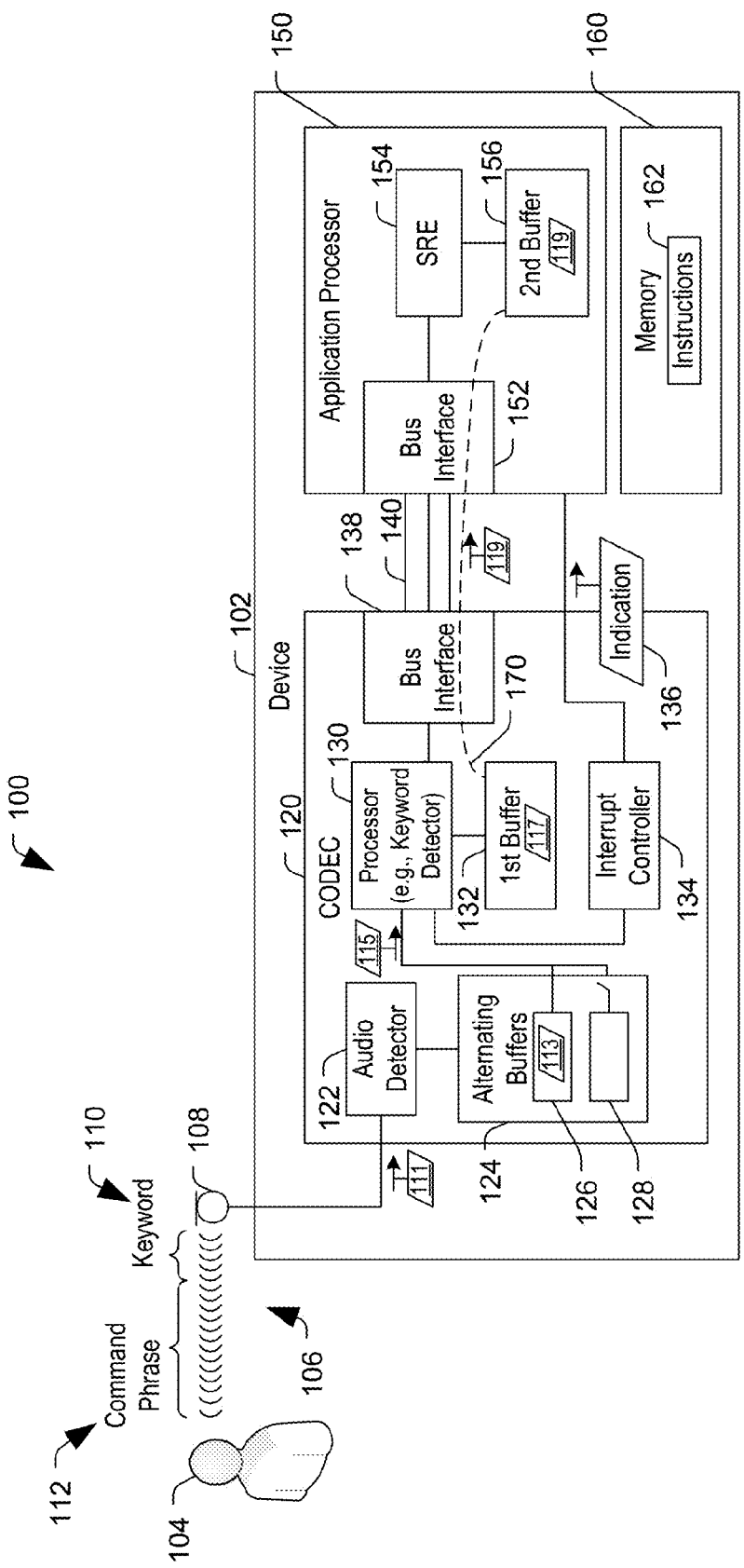
FIG. 1 is a diagram illustrating a particular embodiment of the system 100 that includes a device 102 that is capable of receiving commands via speech.

FIG. 1 is a diagram illustrating a particular embodiment of a system 100 that includes a device 102 that is capable of receiving commands via speech. The device 102 may include or correspond to a mobile device, a portable telephony device, a computing device (e.g., a tablet computer, a personal digital assistant, a laptop computer, etc.), a navigation device, a wearable computing device, an in-vehicle computing device (such as a driver assistance device), or another device configured to receive commands via speech. The device 102 may include an audio transducer, such as a microphone 108, that is capable of detecting an utterance 106 from a user 104. In some instances, the utterance 106 may include a keyword 110, a command phrase 112, or both. For example the user 104 may speak the keyword 110 followed by the command phrase 112 (e.g., as a keyword/command phrase sentence). The device 102 may be configured to receive the keyword 110 and the command phrase 112 without requiring that the user 104 wait for a prompt between the keyword 110 and the command phrase 112.

The device 102 includes a coder/decoder (CODEC) 120 coupled to the microphone 108 and an application processor 150 coupled to the CODEC via a bus 140. For example, the CODEC 120 may include a first bus interface 138 coupled to the bus 140, and the application processor 150 may include a second bus interface 152 coupled to the bus 140. The device 102 may also include a memory 160 that stores instructions 162. The instructions 162 may be executable by the application processor 150 or by another processor (not shown) of the device 102. For example, the instructions 162 may correspond to an application that is executable based on a command in the command phrase 112. To illustrate, the application may be a navigation or map program that is executed in response to the command phrase "where am I?" (or another navigation or location related command phrase). As another example, the application may be executable to receive input based on the command phrase 112. To illustrate, the application may be a search application that receives a search query responsive to the command phrase 112. In yet another example, the application may be executed and may receive input based on the command phrase 112. To illustrate, in response to the command phrase "call mom," a communication application may be started and input indicating a type of communication (e.g., a call) or a destination of the communication (e.g., a telephone number associated with a contact identified as "mom") may be provided to the communication application.

In a particular embodiment, keyword detection and command phrase recognition functions are divided in the device 102 between the CODEC 120 and the application processor 150, respectively. For example, the CODEC 120 may include a processor configured to execute a keyword detector 130. The keyword detector 130 is configured to analyze audio data samples to detect keywords, such as the keyword 110. The application processor 150 may be configured to initialize and execute a speech recognition engine (SRE) 154 to identify a command phrase, such as the command phrase 112, in an utterance 106 by the user.

In the embodiment illustrated in FIG. 1, the CODEC 120 includes an audio detector 122. The audio detector 122 may be configured to receive audio data 111 from the microphone 108 or from other circuitry (not shown), such as an analog-to-digital converter (ADC) or other circuitry coupled to the microphone 108. The audio detector 122 may be configured to determine whether an acoustic signal received at the microphone 108 and represented by the audio data 111 satisfies a threshold. For example, the audio detector 122 may determine whether the audio data 111 satisfies a threshold. To illustrate, the threshold may be a volume threshold, and the audio detector 122 may determine whether the audio data 111 is sufficiently loud to indicate that speech may be present in the acoustic signal. As another illustrative example, the threshold may be a frequency threshold, and the audio detector 122 may determine whether the audio data 111 is within a frequency range corresponding to human speech.

When the audio detector 122 determines that the audio data 111 is of interest (e.g., may include speech), the portion of the audio data 111 may be provided to the keyword detector 130, as audio data samples 115. In a particular embodiment, the portion of the audio data 111 is provided to the keyword detector 130 via a plurality of buffers (e.g., alternating buffers 124). In this embodiment, the alternating buffers 124 include a first alternating buffer 126 and a second alternating buffer 128. When one of the alternating buffers (e.g., the second alternating buffer 128) is in a receive mode, the other alternating buffer (e.g., the first alternating buffer 126) is in a send mode. The alternating buffer that is in the receive mode (e.g., the second alternating buffer 128) may receive and store audio data from the microphone 108 (e.g., a portion of the audio data 111). The alternating buffer that is in the send mode (e.g., the first alternating buffer 126) may send audio data 113 stored at the alternating buffer to the keyword detector (e.g., as a portion of the audio data samples 115). When the alternating buffer in the receive mode is full, the alternating buffers switch roles (e.g., the alternating buffer in the receive mode switches to the send mode, and the alternating buffer in the send mode switches to the receive mode). In other embodiments, the alternating buffers 124 are not used and other buffering mechanisms are used to allow the keyword detector 130 to receive and analyze the audio data samples 115.

The audio data samples 115 may correspond to portions of the audio data 111 that may include speech based on the determination by the audio detector 122. The keyword detector 130 may process the audio data samples 115 to detect a keyword, such as the keyword 110. For example, the keyword detector 130 may compare the audio data samples 115 (or features extracted from the audio data samples) to a keyword model from a memory. In another example, the keyword detector 130 may analyze the audio data samples (or features extracted from the audio data samples 115) using a temporal pattern recognition process, such as a Markov chain model, a hidden Markov model, a semi-Markov model, or a combination thereof. The memory may correspond to a first buffer 132 or may correspond to a different memory (not shown).

When the keyword detector 130 detects a keyword, the keyword detector 130 may provide a signal to an interrupt controller 134. The interrupt controller 134 may provide an indication 136 to the application processor 150 (e.g., via a connection other than the bus 140). Prior to receiving the indication 136, the application processor 150 and the bus 140 may be in a low power state (e.g., a sleep or standby state). In response to the indication 136, the application processor 150 may begin initializing the bus 140. Additionally, the application processor 150 may begin initialization of the speech recognition engine 154.

After detecting the keyword in the audio data samples 115, the keyword detector 130 may cause a set of audio data samples 117 to be stored at the first buffer 132. The set of audio data samples 117 may include all of the audio data samples 115 or may correspond to a subset of the audio data samples 115. For example, the set of audio data samples 117 may exclude audio data samples corresponding to the keyword. As another example, the keyword may be detected by the keyword detector 130 before all of the audio data samples corresponding to the keyword have been analyzed. To illustrate, as each audio data sample is analyzed, the keyword detector 130 may update a confidence value indicating a confidence that a keyword is present in the audio data samples 115. When the confidence satisfies a threshold, the keyword detector 130 may determine that the keyword is present. In this example, the set of audio data samples 117 may include audio data samples that are received after the keyword detector 130 determines that the keyword is present. Thus, the set of audio data samples 117 may include a portion of a keyword. In this example, the keyword detector 130 may identify a last audio data sample of the keyword in the set of audio data samples 117.

In a particular embodiment, establishing a communication connection 170 via the bus 140 is not instantaneous. For example, initializing the bus 140 and preparing the bus 140 for communication between the CODEC 120 and the application processor 150 may take on the order of tens to hundreds of milliseconds (e.g., 10 milliseconds to 1000 milliseconds). Thus, additional data may be received from the microphone 108 after the indication 136 is sent and before the bus 140 is ready. The additional data may be stored at the first buffer 132 (e.g., as part of the set of audio data samples 117) until the bus 140 is ready.

When the bus 140 is ready (e.g., when the communication connection 170 is established between the CODEC 120 and the application processor 150), at least a portion 119 of the set of audio data samples 117 may be transferred over the communication channel 170 to the second buffer 156. In a particular embodiment, all of the audio data samples of the set of audio data samples 117 are transferred to the second buffer 156. In another embodiment, a subset of the set of audio data samples 117 is transferred. For example, as explained above, the set of audio data samples 117 may include data corresponding to at least a portion of the keyword 110. In this example, the portion 119 of the set of audio data samples 117 transferred to the second buffer 156 may exclude the portion of the keyword 110. For example, the keyword detector 130 may determine the final audio data sample of the keyword 110, and the next audio data sample may be used as a starting point for transferring of the portion 119 of the set of audio data samples 117 to the second buffer 156.

As additional audio data samples are received from the microphone 108, the additional data samples may be buffered at the first buffer 132 and subsequently transferred (in a first in first out manner) to the second buffer 156. On average (e.g., over a second), the audio data samples buffered at the first buffer 132 may be sent to the second buffer 156 at the same rate that new audio data samples are received at the first buffer 132. Thus, the first buffer 132 does not need to store the entire command phrase 112. Rather, it is sufficient for the first buffer 132 to have capacity to store audio data samples that may be received during a time period between a first time at detection of the keyword 110 and a second time when the bus 140 is ready. For example, the first buffer 132 may be sized (e.g., have capacity) to store approximately 250 milliseconds worth of audio data samples at an audio sampling rate of 16 samples per millisecond.

The second buffer 156 may continue to store audio data samples 119 until the speech recognition engine 154 is ready. When the speech recognition engine 154 is ready, the speech recognition engine 154 may access the second buffer 156 and perform speech recognition on the audio data samples 119 from the second buffer 156. For example, the speech recognition engine 154 may determine whether the utterance 106 includes a command phrase, such as the command phrase 112. To illustrate, the speech recognition engine 154 may analyze the audio data samples 119 (or features extracted from the audio data samples 119) using a temporal pattern recognition process, such as a Markov chain model, a hidden Markov model, a semi-Markov model, or a combination thereof. When the speech recognition engine 154 detects and recognizes the command phrase 112, the application processor 150 may determine whether the command phrase 112 is mapped to a particular action (e.g., based on mapping information (not shown) in the memory 160. If the command phrase 112 is mapped to a particular action, the application processor 150 may initiate the particular action responsive to the command phrase 112. For example, the application processor 150 may cause the instructions 162 from the memory 160 to be executed to provide a service (e.g., display a map) or a response (e.g., provide directions) based on the command phrase 112. Thus, the system 100 enables the user 104 to conveniently provide a keyword/command phrase sentence without waiting for the device 102 to wake up and provide a prompt.

Figure 2:
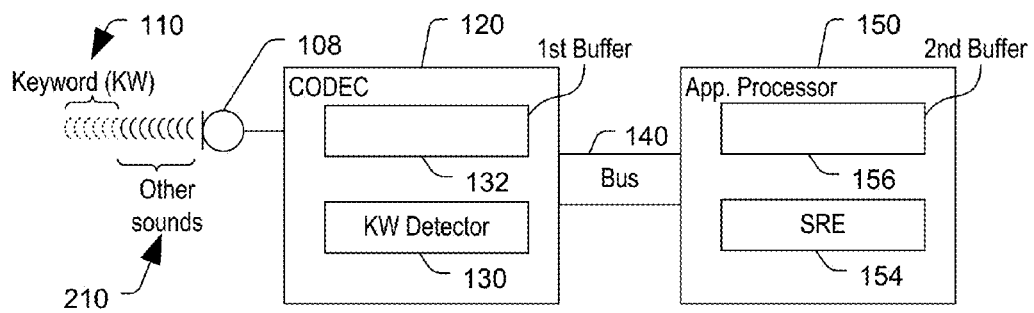
FIG. 2 is a diagram illustrating a particular embodiment of a first stage during interaction between a CODEC and an application processor of the device of FIG. 1.

FIGS. 2-7 illustrate stages of interaction between the CODEC 120 and the application processor 150 of FIG. 1. FIG. 2 illustrates a particular embodiment of a first stage during interaction between the CODEC 120 and the application processor 150. In the first stage, no keyword 110 has been detected by the keyword detector 130. For example, other sounds 210 may be received by the microphone 108 before the keyword 110 is received at the microphone 108. When the other sounds 210 are received, the audio detector 122 of FIG. 1 may indicate that no speech is present (e.g., the other sounds 210 fail to satisfy a threshold). Alternately, the audio detector 122 may determine that the other sounds 210 satisfy the threshold and may provide audio data to the keyword detector 130; however, the keyword detector 130 may determine that the audio data corresponding to the other sounds 210 does not include the keyword 110. During the first stage illustrated in FIG. 2 (e.g., before the keyword 110 is detected), the application processor 150 and the bus 140 may be in a low power state, such as a sleep state or standby state, in order to conserve power.

Figure 3:
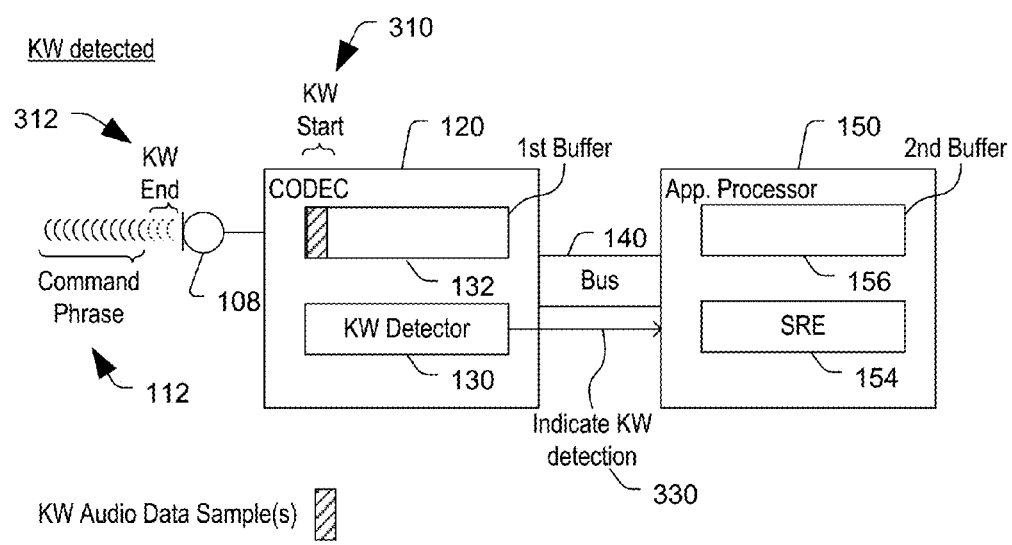
FIG. 3 is a diagram illustrating a particular embodiment of a second stage during interaction between the CODEC and the application processor of the device of FIG. 1.

FIG. 3 illustrates a particular embodiment of a second stage during interaction between the CODEC 120 and the application processor 150. In the second stage, the keyword 110 is detected by the keyword detector 130. For example, the keyword detector 130 may analyze received audio data samples and may determine a confidence value indicating a likelihood (based on the received audio data samples) that the keyword is present in the utterance 106. When the confidence value satisfies a threshold (e.g., indicates a relatively high probability that the utterance 106 includes the keyword 110), the keyword detector 130 may determine that the keyword 110 is present. Thus, for example, the keyword detector 130 may detect the keyword 110 based on only a portion of the keyword 110.

When the keyword 110 is detected, the keyword detector 130 may cause audio data samples to be stored at the buffer 132. For example, as illustrated in FIG. 3, audio data samples corresponding to a start 310 of the keyword 110 may be stored at the buffer 132 while an end of the keyword 312 is still being received at the microphone 108. Thus, in a particular embodiment, buffering of audio data samples at the first buffer 132 may begin before the command phrase 112 is received at the microphone 108.

Additionally, when the keyword 110 is detected, the keyword detector 130 may send an indication 330 of detection of the keyword 110 to the application processor 150 (e.g., via a connection (not shown) between the CODEC 120 and the application processor 150 that is distinct from the bus 140). In response to the indication 330, the application processor 150 may begin transitioning from a low power state to a higher power state (e.g., a ready state). For example, the application processor 150 may begin initializing the bus 140. Additionally, the application processor 150 may begin loading instructions corresponding to the speech recognition engine 154.

Figure 4:
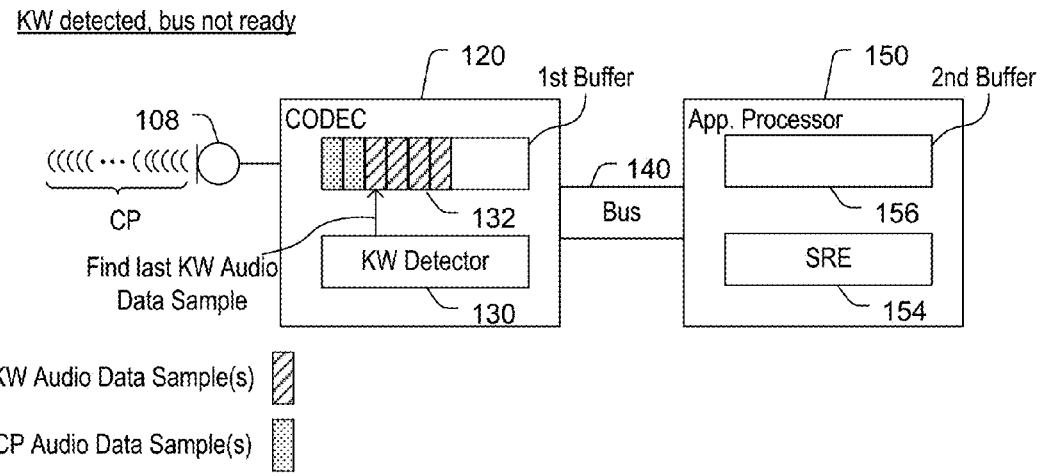
FIG. 4 is a diagram illustrating a particular embodiment of a third stage during interaction between the CODEC and the application processor of the device of FIG. 1.

FIG. 4 illustrates a particular embodiment of a third stage during interaction between the CODEC 120 and the application processor 150. In the third stage, the keyword 110 has been detected but the bus 140 is not ready. Thus, the third stage corresponds to a time period for the bus 140 to transition from the low power state to the awake state, which may be more than 10 milliseconds. Since the microphone 108 may sample the acoustic signal multiple times during the time period for the bus 140 to be readied, additional samples may be received at the CODEC 120 after detection of the keyword 110 and before the bus 140 is ready. The additional audio data samples may be buffered at the first buffer 132. Additionally, during the third stage, the keyword detector 130 may identify a last audio data sample of the keyword 110 in the buffer 132. To illustrate, in the example illustrated in FIG. 4, the first buffer 132 includes several audio data samples corresponding to the keyword 110 and several audio data samples corresponding to the command phrase (CP) 112 or other audio data samples that are subsequent to the last audio data sample of the keyword 110. The keyword detector 130 may determine which audio data sample in the buffer 132 is the last audio data sample of the keyword 110.

Figure 5:
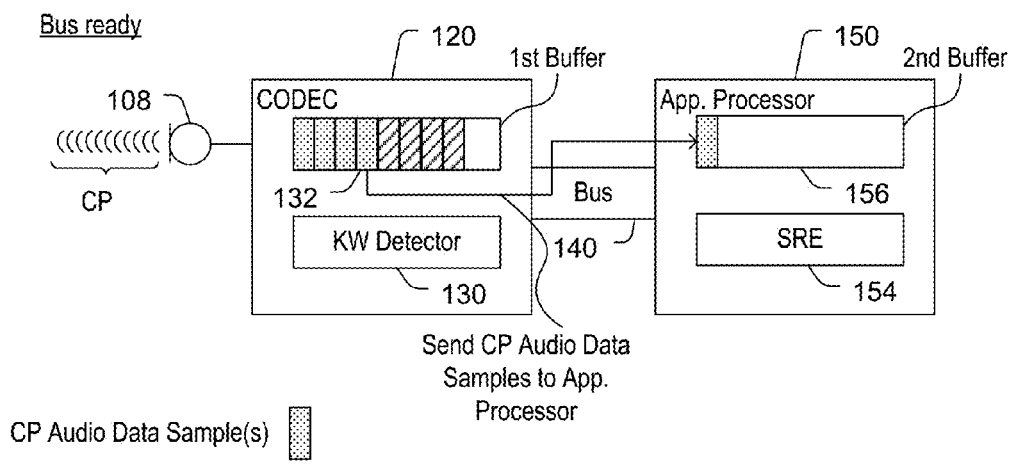
FIG. 5 is a diagram illustrating a particular embodiment of a fourth stage during interaction between the CODEC and the application processor of the device of FIG. 1.

FIG. 5 illustrates a particular embodiment of a fourth stage during interaction between the CODEC 120 and the application processor 150. In the fourth stage, the bus 140 is ready (e.g., the communication channel 170 is available between the CODEC 120 and the application processor 150). When the bus 140 is ready, a set of audio data samples following the last audio data sample of the keyword 110 may be transferred via the bus 140 from the first buffer 132 to the second buffer 156. Audio data samples that correspond to the keyword 110 may be flushed from the first buffer 132. In another embodiment, the audio data samples corresponding to the keyword 110 may be transferred to the second buffer 156 via the bus 140 and may be omitted by the speech recognition engine 154 from processing.

Figure 6:
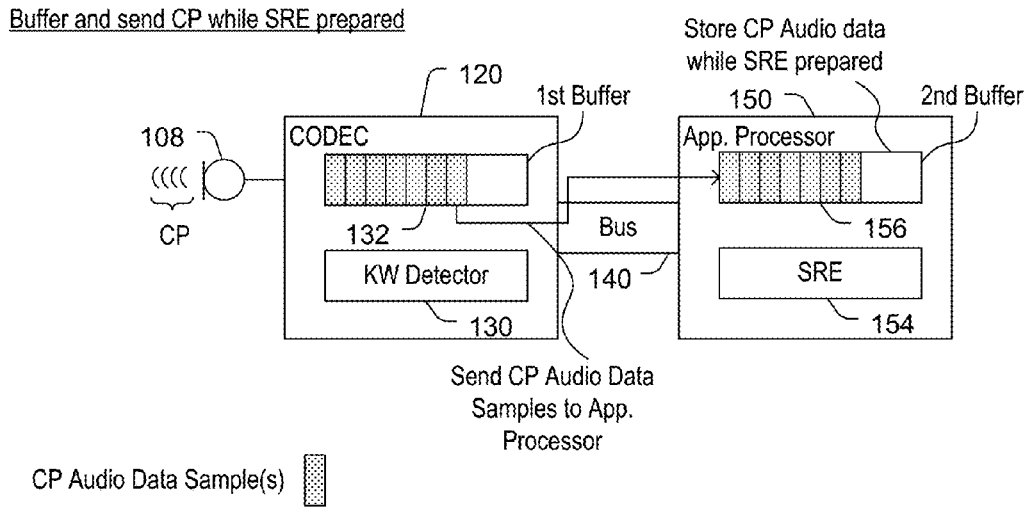
FIG. 6 is a diagram illustrating a particular embodiment of a fifth stage during interaction between the CODEC and the application processor of the device of FIG. 1.

FIG. 6 illustrates a particular embodiment of a fifth stage during interaction between the CODEC 120 and the application processor 150. In the fifth stage, the audio data samples stored at the first buffer 132 when the bus 140 was ready (e.g., at the fourth stage) have all been sent to the second buffer 156. The speech recognition engine 154 may take longer to prepare than the bus 140. For example, the speech recognition engine 154 may take more than one second to be ready. Accordingly, additional audio data samples may be received after the bus 140 is ready and before the speech recognition engine 154 is ready. The additional audio data samples may be buffered at the first buffer 132 and subsequently transferred to the second buffer 156 while the speech recognition engine 154 is being prepared.

In some instances, the command phrase 112 may be longer than can be stored at the first buffer 132 based on a capacity of the first buffer 132. Accordingly, the first buffer 132 may receive audio data samples from a microphone 108 at approximately the same average rate that it sends audio data samples to the second buffer 156. In another example, the first buffer 132 may send audio data samples to the second buffer 156 at a rate that is greater than a rate that the audio data samples are received by the first buffer 132. The second buffer 156 may be considerably larger than the first buffer 132. Accordingly, the second buffer 156 may have sufficient capacity to store the entire command phrase 112 while the speech recognition engine 154 is being prepared.

Figure 7:
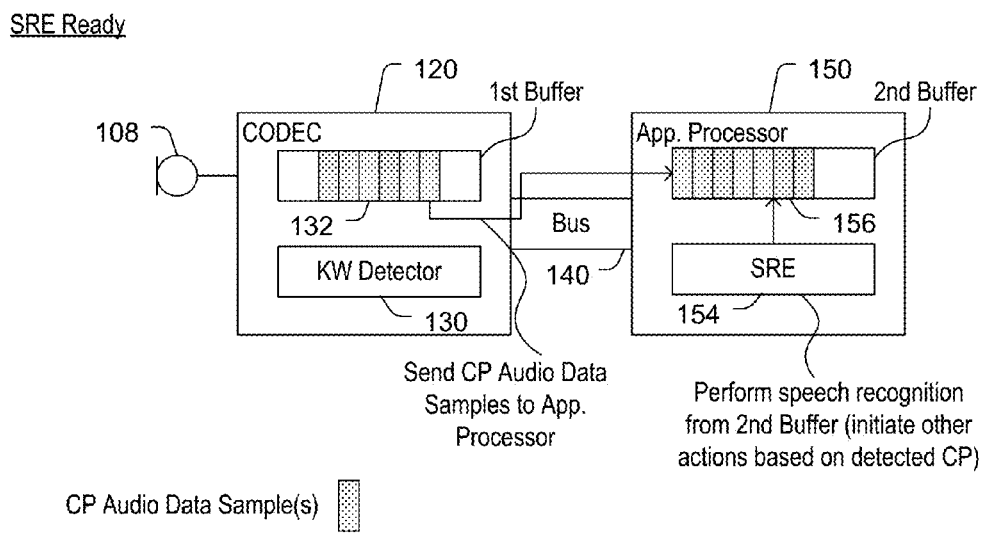
FIG. 7 is a diagram illustrating a particular embodiment of a sixth stage during interaction between the CODEC and the application processor of the device of FIG. 1.

FIG. 7 illustrates a particular embodiment of a sixth stage during interaction between the CODEC 120 and the application processor 150. In the sixth stage, the speech recognition engine 154 is ready. When the speech recognition engine 154 is loaded and ready to execute, the speech recognition engine 154 may access audio data samples from the second buffer 156. The speech recognition engine 154 may perform speech recognition on the audio data samples from the second buffer 156, and may initiate other actions based on the detected command phrase 112. For example, the speech recognition engine 154 may cause instructions corresponding to another application to be executed at the application processor 150. In some embodiments, when the command phrase is particularly long, audio data samples may continue to be provided from the first buffer 132 to the second buffer 156 after the speech recognition engine 154 is prepared. The SRE 154 may process the audio data samples from the second buffer 156 in real time (e.g., at approximately the same average rate that the audio data samples are received at the second buffer 156) or may process the audio data samples from the second buffer 156 at a rate that is faster than in real time (e.g., at an average rate that is greater than a rate at which the audio data samples are received at the second buffer 156). When the SRE 154 processes the audio data samples faster than real time, overall latency of recognizing commands and taking corresponding actions can be reduced since delay associated with the SRE 154 is low. Thus, the CODEC 120 and application processor 150 enable a user to conveniently provide a keyword/command phrase sentence without waiting for the application processor 150 to wake up and provide a prompt.

When the speech recognition engine 154 has performed speech recognition to identify the command phrase 112 (e.g., text corresponding to the command phrase 112), the application processor 150 may determine an action to be performed responsive to the command phrase. For example, the memory 160 may include data mapping particular command phrases to corresponding actions. After determining an action corresponding to the command phrase 112, the application processor 150 may cause the action(s) to be performed. If no additional input is received (e.g., there is no activity), the application processor 150 may subsequently return to a low power state. For example, the application processor 150 and the bus 140 may be transitioned back to the low power state to await additional input.

Although FIGS. 1-7 have been described in terms of receiving and processing audio data, the CODEC 120 and application processor 150 may be used in a similar manner to process other data. For example, rather than, or in addition to, receiving audio data samples, the CODEC 120 may receive image frames (e.g., video data samples). In this example, the audio detector 122 may be replaced with or supplemented with an image pattern detector (e.g., a light detector, an edge detector, a color detector, a motion detector, or another relatively simple, fast detector) that can screen image data substantially in real time to detect an image frame or a set of image frames that may be of interest. Additionally, in this example, the keyword detector 130 may be replaced with or supplemented with an image processing device, such as a face detector or an object detector. The image processing device may determine whether an object of interest is present in the image frame or the set of image frames and may cause image frames to be buffered at the first buffer 132 while a more complex processing system, such as a video processing system, is prepared for execution by the application processor 150. When the bus 140 is ready, the image frames may be transferred (in a first-in-first-out manner, as described above) from the first buffer 132 to the second buffer 156 for processing by the video processing system. The video processing system may analyze the image frames from the second buffer 156 to detect, for example, a gesture, a facial expression, or another visual cue. In this example, the video processing system may cause an action to be performed based on the analysis of the image frames. To illustrate, the system in this example may be used in a gesture recognition system. Thus, a gesture by a user may be detected and an action corresponding to the gesture may be performed. In addition to, or instead of, audio data and image data, the CODEC 120 and application processor 150 may be used to process other data, such as data from a sensor, in circumstances which may benefit from keeping the application processor 150 in a low power state until relevant data is received, then buffering the data while the application processor 150 is readied to analyze the data.

Figure 8:
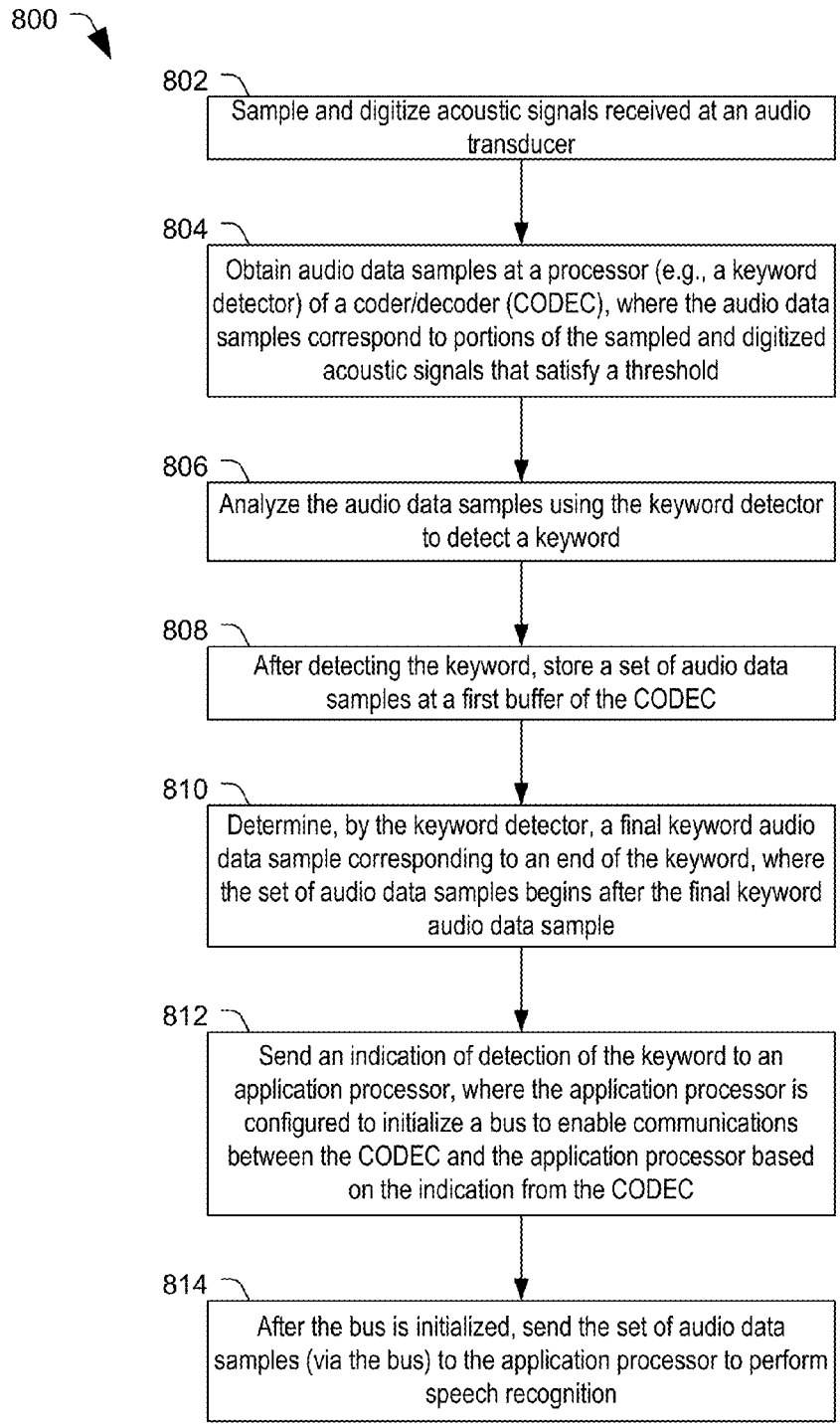
FIG. 8 is a flowchart illustrating a particular embodiment of a method performed by the device of FIG. 1.

FIG. 8 is a flow chart of a particular embodiment of a method 800 of performing speech recognition. The method 800 may be performed by the device 102 of FIG. 1. The method 800 includes, at 802, sampling and digitizing acoustic signals received at an audio transducer. For example, the audio transducer may include or correspond to the microphone 108 of FIG. 1. The microphone 108 of FIG. 1 and other circuitry, such as an ADC, may sample and digitize acoustic signals, such as the utterance 106, to generate the audio data 111.

The method 800 may also include, at 804, obtaining audio data samples at a keyword detector of a CODEC. The audio data samples may correspond to portions of the sampled and digitized acoustic signals that satisfy a threshold. For example, the audio data 111 may be provided to the audio detector 122 of FIG. 1. The audio detector 122 may determine whether any portion of the audio data 111 satisfied a threshold that indicates that speech may be present in the audio data 111. When the audio detector 122 determines that a portion of the audio data 111 may include speech, the portion of the audio data 111 may be provided to the keyword detector as the audio data samples 115.

The method 800 also includes, at 806, analyzing the audio data samples using the keyword detector to detect a keyword. For example, the keyword detector 130 may analyze the audio data samples 115 to determine whether the audio data samples 115 include a keyword. The method may also include, at 808, after detecting the keyword, storing a set of audio data samples at a first buffer of the CODEC. For example, after the keyword detector 130 detects the keyword 110 based on the audio data samples 115, the keyword detector 130 may cause the first buffer 132 to store a set of audio data samples 117. The set of audio data samples 117 may include all of the audio data samples 115 or may include a subset of the audio data samples 115, such as those portions of the audio data samples 115 received after the keyword 110 was detected.

In a particular embodiment, the method 800 includes, at 810, determining a final keyword audio data sample corresponding to an end of the keyword. For example, the keyword detector 130 may analyze the set of audio data samples 117 to determine which audio data sample of the set of audio data samples 117 corresponds to the last audio data sample of the keyword 110. In other embodiments, the method 800 does not include determining the final keyword audio data sample.

After detecting the keyword, the method 800 may also include, at 812, sending an indication of detection of the keyword to the application processor. The application processor may be configured to initialize a bus to enable communication between the CODEC and the application processor based on the indication from the CODEC. For example, when the keyword detector 130 detects the keyword 110 based on the audio data samples 115, the keyword detector 130 may cause the indication 136 to be transmitted to the application processor 150. In response to receiving the indication 136, the application processor 150 may initialize the bus 140. Additionally, the application processor 150 may begin preparing the speech recognition engine 154. For example, the application processor 150 may access instructions from the memory 160 and may load instructions corresponding to the speech recognition engine 154 to working memory of the application processor 150. When the bus 140 is prepared (e.g., after the bus is initialized), the bus interface 152 of the application processor 150 may provide a signal to the bus interface 138 of the CODEC 120. The signal may indicate that the bus 140 is ready. While the bus 140 is being prepared, audio data samples received from the microphone 108 may continue to be stored at the first buffer 132.

After the bus is initialized, the method 800 may include, at 814, sending the set of audio data samples (e.g., from the first buffer via the bus) to the application processor to perform speech recognition. In embodiments that include determining the final keyword audio data sample, at 810, the audio data samples may be sent via the bus beginning after the final keyword audio data sample. For example, the first buffer 132 may include the set of audio data samples 117. After a communication channel 170 is available, via the bus 140, to second buffer 156, the set of audio data samples 119 may be transferred from the first buffer 132 to the second buffer 156. The set of audio data samples 119 may include audio data samples received after the final keyword audio data sample. In embodiments that do not include determining the final keyword audio data sample, at 810, all of the audio data samples received at the first buffer or a set of the audio data samples received at the first buffer after the keyword is detected may be sent to the application processor. The set of audio data samples 119 may include audio data samples that were not in the first buffer 132 when the communication connection 170 became available. For example, the microphone 108 may continue to receive acoustic signals corresponding to the utterance 106 and may generate additional audio data samples corresponding to the acoustic signals. The additional audio data samples may be stored at the first buffer 132. The first buffer 132 may act as a first in first out buffer to receive the additional audio data samples and to transfer the additional audio data samples via the bus 140 to the second buffer 156 while the speech recognition engine 154 is being prepared. After the speech recognition engine 154 is prepared, the speech recognition engine 154 may access the second buffer 156 to perform speech recognition based on the audio data samples stored at the second buffer 156.

Figure 9:
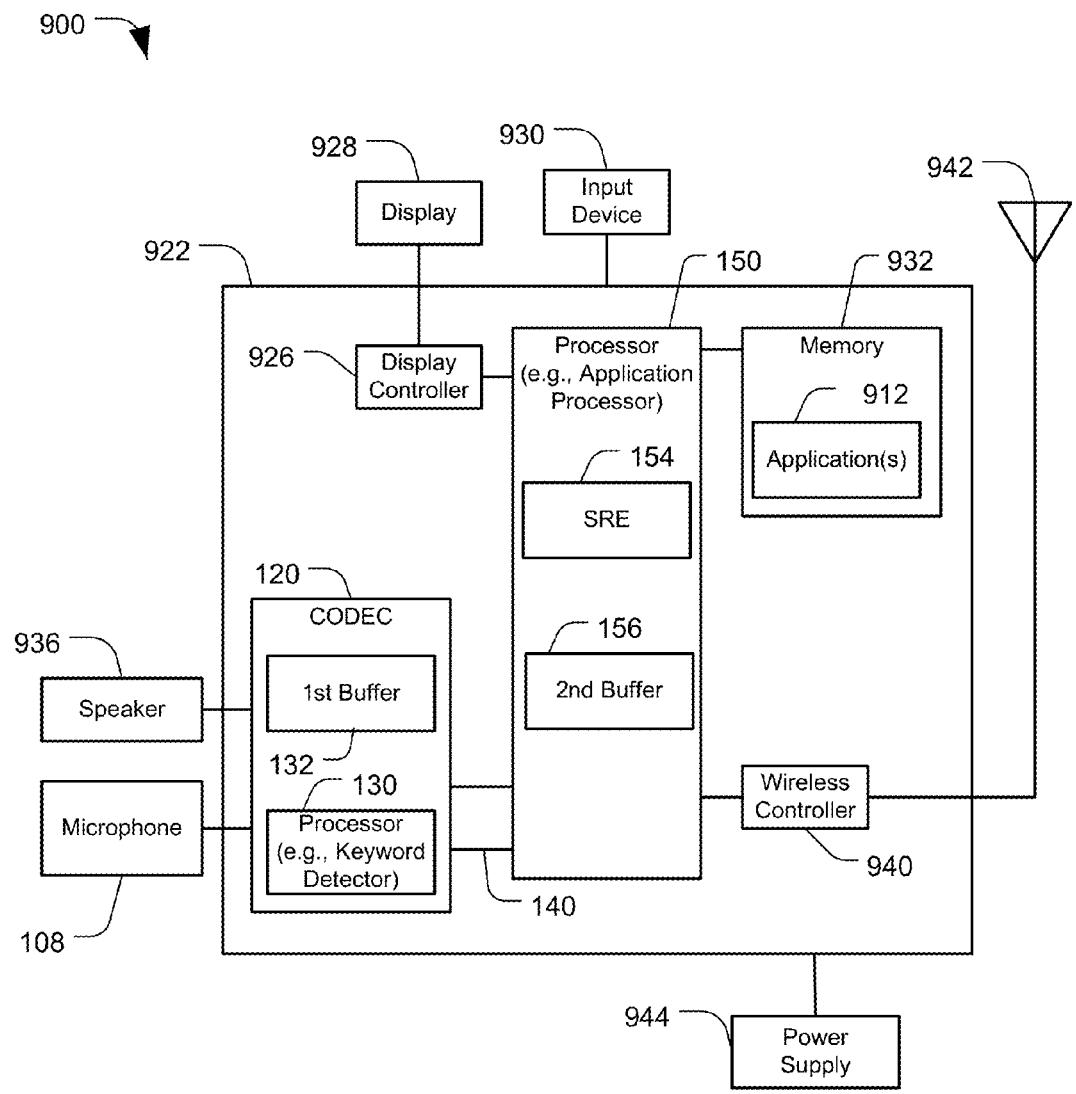
FIG. 9 is a block diagram of a particular embodiment of an electronic device including the CODEC and the application processor of FIG. 1.

Referring to FIG. 9, a block diagram of a particular illustrative embodiment of an electronic device is depicted and generally designated 900. The electronic device 900 may correspond to the device 102 of FIG. 1. For example, the electronic device 900 may include the CODEC 120 and the application processor 150. The electronic device 900 may include or correspond to a mobile device, a portable telephony device, a computing device (e.g., a tablet computer, a personal digital assistant, a laptop computer, etc.), a navigation device, a wearable computing device, an in-vehicle computing device (such as a driver assistance device), or another device configured to receive commands via speech.

The application processor 150 may include a digital signal processor (DSP). The application processor 150 may be coupled to a memory 932. The memory 932 may include instructions that are executable by the application processor 150, such as instructions corresponding to one or more applications 912.

The electronic device 900 may also include a display controller 926 that is coupled to the application processor 150 and to a display 928. The CODEC 120 may also be coupled to the application processor 150 via the bus 140. A speaker 936 and the microphone 108 can be coupled to the CODEC 120. In a particular embodiment, as explained above, the CODEC 120 includes the keyword detector 130 and the first buffer 132. The keyword detector 130 is configured to analyze audio data samples (received from the microphone 108) to detect a keyword. The CODEC 120 is configured to store a set of audio data samples at the first buffer 132. Additionally, the application processor 150 is configured to receive the set of audio data samples from the CODEC 120 via the bus 140 and to initialize and execute the speech recognition engine (SRE) 154 based on the set of audio data samples. The application processor 150 is also configured to initializes the bus 140 based on an indication from the CODEC 120 that the keyword is detected.

FIG. 9 also indicates that the electronic device 900 can include a wireless controller 940 coupled to the application processor 150 and to an antenna 942. In a particular embodiment, the application processor 150, the display controller 926, the memory 932, the CODEC 120, and the wireless controller 940 are included in a system-in-package or system-on-chip device 922. In a particular embodiment, an input device 930 and a power supply 944 are coupled to the system-on-chip device 922. Moreover, in a particular embodiment, as illustrated in FIG. 9, the display 928, the input device 930, the speaker 936, the microphone 108, the antenna 942, and the power supply 944 are external to the system-on-chip device 922. However, each of the display 928, the input device 930, the speaker 936, the microphone 108, the antenna 942, and the power supply 944 can be coupled to a component of the system-on-chip device 922, such as an interface or a controller.

In conjunction with the described embodiments, a system is disclosed that includes means for obtaining audio data samples and analyzing the audio data samples to detect a keyword. For example, the means for obtaining audio data samples and analyzing the audio data samples to detect a keyword may correspond to the CODEC 120 of FIGS. 1-7, the keyword detector 130 of FIGS. 1-7, one or more other devices or circuits configured to store one or more bits, or any combination thereof. The system may also include means for storing a set of audio data samples after detecting the keyword. For example, the means for storing a set of audio data samples after detecting the keyword may correspond to the CODEC 120 of FIGS. 1-7, the first buffer 132 of FIGS. 1-7, one or more other devices or circuits configured to store one or more bits, or any combination thereof. The system may also include means for sending an indication of detection of the keyword to an application processor after detecting the keyword. For example, the means for sending an indication of detection of the keyword to an application processor after detecting the keyword may correspond to the CODEC 120 of FIGS. 1-7, the keyword detector 130 of FIGS. 1-7, the interrupt controller 134 of FIG. 1, one or more other devices or circuits configured to store one or more bits, or any combination thereof. The system may also include means for sending the set of audio data samples via the bus to the application processor to perform speech recognition based on the set of audio data samples. For example, the means for sending the set of audio data samples may correspond to the CODEC 120 of FIGS. 1-7, the keyword detector 130 of FIGS. 1-7, the bus interface 138 of FIG. 1, the bus 140 of FIGS. 1-7, one or more other devices or circuits configured to store one or more bits, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
a coder/decoder (CODEC) including a first processor and a first buffer, wherein the first processor is configured to analyze audio data samples to detect a keyword and the CODEC is configured to store a set of audio data samples at the first buffer; and
an application processor configured to receive the set of audio data samples from the CODEC via a bus, wherein the application processor is configured to initialize a speech recognition engine (SRE) based on the set of audio data samples, and wherein the application processor is further configured to initialize the bus based on an indication from the CODEC that the keyword is detected.

2. The apparatus of claim 1, wherein the application processor includes a second buffer configured to store the set of audio data samples after initialization of the bus and during initialization of the SRE.

3. The apparatus of claim 2, wherein the CODEC is further configured to send the set of audio data samples from the first buffer to the second buffer via the bus after the bus is initialized.

4. The apparatus of claim 2, wherein the set of audio data samples are received at the first buffer at a first rate and are sent to the second buffer at a second rate, and wherein the first rate is approximately equal to the second rate.

5. The apparatus of claim 1, wherein the application processor is configured to initialize the SRE based on the indication from the CODEC and to perform speech recognition on the set of audio data samples.

6. The apparatus of claim 1, wherein the application processor and the bus are configured to operate in a low power mode until the keyword is detected.

7. The apparatus of claim 1, wherein the first buffer has a first capacity that is greater than or equal to a first portion of audio data, the first portion of audio data corresponding to the audio data samples received between a first time of detection of the keyword and a second time of receipt of an indication that the bus has been initialized.

8. The apparatus of claim 7, wherein the first capacity is less than a second portion of audio data, the second portion of audio data corresponding to a command phrase.

9. The apparatus of claim 7, wherein the application processor includes a second buffer to store the set of audio data samples received from the CODEC, wherein the second buffer has a second capacity that is greater than the first capacity.

10. The apparatus of claim 1, wherein the SRE is executable to analyze the set of audio data samples to detect a command phrase.

11. The apparatus of claim 1, wherein the first processor is configured to determine a final keyword audio data sample corresponding to an end of the keyword, and wherein the set of audio data samples begins after the final keyword audio data sample.

12. The apparatus of claim 1, further comprising:
an audio transducer configured to receive acoustic signals and generate the audio data samples based on the acoustic signals;
an audio detector configured to determine whether a particular audio data sample from the audio transducer satisfies a threshold; and
a plurality of buffers configured such that, when one of the buffers is in a receive mode, another of the buffers is in a send mode, wherein, when in the receive mode, one of the plurality of buffers is configured to receive the particular audio data sample that satisfies the threshold, and when in the send mode, the one of the plurality of buffers is configured to provide the particular audio data sample to the first processor.

13. A method comprising:
obtaining audio data samples at a first processor;
analyzing the audio data samples to detect a keyword;
after detecting the keyword:
storing a set of audio data samples in a first buffer of a coder/decoder (CODEC);
sending an indication of detection of the keyword to an application processor, wherein the application processor is configured to initialize a bus to enable communication between the CODEC and the application processor based on the indication from the CODEC; and
after the bus is initialized, sending the set of audio data samples to the application processor to perform speech recognition.

14. The method of claim 13, further comprising:
storing the set of audio data samples in a second buffer of the application processor, wherein the set of audio data samples are stored after initialization of the bus and during initialization of a speech recognition engine (SRE).

15. The method of claim 13, further comprising:
operating the application processor and the bus in a low power mode before the keyword is detected; and
operating the application processor and the bus switch in a higher power mode after the keyword is detected.

16. The method of claim 13, further comprising determining a final keyword audio data sample corresponding to an end of the keyword, wherein the set of audio data samples begins after the final keyword audio data sample.

17. The method of claim 13, further comprising sampling and digitizing acoustic signals received at an audio transducer, wherein the audio data samples obtained at the first processor correspond to portions of the sampled and digitized acoustic signals that satisfy a threshold.

18. A non-transitory computer-readable storage device storing instructions that are executable by a processor of a coder/decoder (CODEC) to cause the processor to perform operations comprising:
analyzing audio data samples to detect a keyword;
after detecting the keyword:
storing a set of audio data samples at a first buffer of the CODEC;
sending an indication of detection of the keyword to an application processor, wherein the application processor is configured to initialize a bus to enable communications between the CODEC and the application processor based on the indication from the CODEC; and
after the bus is initialized, sending the set of audio data samples to the application processor to perform speech recognition.

19. The non-transitory computer-readable storage device of claim 18, wherein the operations further comprise:
determining a first potential command phrase audio data sample, the first potential command phrase audio data sample following a final keyword audio data sample in the audio data samples, wherein the set of audio data samples stored in the first buffer begins at the first potential command phrase audio data sample and includes additional potential command phrase audio data samples to be analyzed by the application processor to detect a command phrase, and wherein the command phrase corresponds to more audio data samples than can be stored concurrently in the first buffer.

20. The non-transitory computer-readable storage device of claim 18, wherein the operations further comprise:
storing the set of audio data samples in a second buffer of the application processor, wherein the set of audio data samples are stored after initialization of the bus and during initialization of a speech recognition engine (SRE).

* * * * *